(12) United States Patent
Forrest et al.

(10) Patent No.: US 7,245,708 B2
(45) Date of Patent: Jul. 17, 2007

(54) ACOUSTIC COUPLING PRODUCT LABEL

(75) Inventors: Simon J. Forrest, Dundee (GB); Grant McNicoll, Angus (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 11/006,978

(22) Filed: Dec. 8, 2004

(65) Prior Publication Data
US 2005/0129200 A1 Jun. 16, 2005

(30) Foreign Application Priority Data
Dec. 11, 2003 (GB) ................... 0328708.3

(51) Int. Cl.
*H04M 11/00* (2006.01)
(52) U.S. Cl. .................. 379/93.37; 379/93.26
(58) Field of Classification Search ............. 379/93.37, 379/357.03, 93.26
See application file for complete search history.

(56) References Cited

U.S. PATENT DOCUMENTS

| | | | |
|---|---|---|---|
| 4,980,910 A | | 12/1990 | Oba et al. |
| 5,343,519 A | | 8/1994 | Feldman |
| 5,636,271 A | * | 6/1997 | Paterno et al. .......... 379/357.03 |
| 5,825,871 A | * | 10/1998 | Mark ..................... 379/357.03 |
| 5,854,828 A | * | 12/1998 | Kocis et al. ............. 379/93.31 |
| 6,327,365 B1 | * | 12/2001 | Kiger, II ................ 379/357.03 |
| 6,697,466 B2 | * | 2/2004 | Howard et al. .......... 379/93.37 |

FOREIGN PATENT DOCUMENTS

| | | |
|---|---|---|
| EP | 0 913 978 A2 | 5/1999 |
| FR | 2 795 266 A1 | 12/2000 |
| GB | 2 386 236 A | 9/2003 |
| WO | WO 88/03294 | 5/1988 |

* cited by examiner

*Primary Examiner*—Stella Woo
(74) *Attorney, Agent, or Firm*—Gregory A. Welte

(57) ABSTRACT

A system comprises an acoustic coupling product label (20) for mounting on a product to be serviced. The label (20) includes a memory (23) for storing information relating to the product to be serviced, control means (29) for controlling the flow of data from the label (20), an activation switch (22), and an acoustic transducer that emits tones corresponding to said product information. The system further includes a telephone (30) and a computerized product support system (50), which collects and interprets the information provided by the label (20). The control means (29) is arranged to control the flow of data from the label (20) to the system (50) at a rate and time required by the system (50).

33 Claims, 4 Drawing Sheets

ACOUSTIC COUPLING PRODUCT LABEL

The present invention relates to an acoustic coupling product label and a method of using the label.

BACKGROUND OF THE INVENTION

There are a number of problems associated with the reporting of faults on self-service devices, such as Automated Teller Machines (ATMs). Normally a fault is reported by someone in the vicinity of the device, who calls a service centre. They then verbally quote the serial number of the device, which is compared to a service database, by call centre staff, to determine the level of service contract covering the device before the call is connected to a customer care agent.

The present system is based on a label that is mounted on the device, the issues arise where the label may be inaccessible, or the person placing the call to the service centre may just misread the serial number.

This problem is exacerbated by regulations from product-certification organizations such as UL (Underwriter Laboratories Inc.), CSA (Canadian Standards Association), and VDE (Verband Deutscher Elektrotechniker), which specify that the printed serial number label must be attached to the frame of the product, near its power source, which is usually on or near the base of the product. Unfortunately this placement of the printed serial number label may cause difficulty for the customer trying to find the desired product serial number in a timely and accurate manner, so the serial number may be given to the service provider. Also, a product's serial number may be hidden by mounting equipment requiring burdensome disassembly, such as having to remove a cash register from its mounting in a check-out stand.

The initial telephone connection to the service centre and the serial number reporting could be automated, as is disclosed in the applicant's US patent, U.S. Pat. No. 6,327,365, by attaching an acoustic coupling device to the self-service device that automatically dials the service centre and then automatically reports the serial number only. This solves the problem of the initial connection but does not address the required communications between the label on the device and the automated Computer Telephony Integration (CTI) system in the call centre.

Due to the levels of experience of the staff in some environments they may not be able to correctly identify the configuration of the device they are reporting the fault on. This can lead to an extended call to the service centre while basic configuration information for a device is sought. This is an inefficient use of the time of the customer care agent and can be frustrating for the customer.

There is a need to provide a product label for assisting customers or, in the case of financial institutions, members of staff, in providing more extensive product information easily and accurately during a service call, preferably near the beginning of the service call.

SUMMARY OF THE INVENTION

According to a first aspect of the present invention there is provided a system comprising: an acoustic coupling product label for mounting on a product to be serviced, said label including a memory for storing information relating to the product to be serviced, control means for controlling the flow of data from the label, an activation switch, and an acoustic transducer which emits tones corresponding to said product information; a telephone; and a computerized product support system which collects and interprets the information provided by the label, wherein the control means is arranged to control the flow of data from the label to the system at a rate and time required by the system.

Preferably, additional tones corresponding to the telephone number of the service provider are transmitted before the tones corresponding to the product information.

Preferably, the system transmits a human audible message to the user prior to the call being terminated.

Preferably, the system notifies appropriate service personnel for the product to be serviced.

According to a second aspect of the present invention there is provided an acoustic coupling product label for mounting on or near the front of a product or in an easily accessible location on a product to be serviced, comprising: a memory for storing information relating to the product to be serviced, and control means for controlling the flow of data between the label and a computerized product support system, an activation switch, and an acoustic transducer which emits tones corresponding to said product information, wherein the control means is arranged to control the flow of data from the label to the system at a rate and time required by the system.

Preferably, the label further includes a power source, which is independent of a power source of the product to be serviced.

Preferably, the label is arranged to broadcast information that is audible to a human.

Preferably, the label includes at least two buttons, the actuation of each provides broadcast information in a different language.

Preferably, the label is adapted for dynamic updating of the information in the memory. Most preferably, the information in the memory is updated from the product to be serviced, via a sound card. Alternatively, the information in the memory is updated via the use of a device, which is used to capture the configuration information and convert it into tones that are then transmitted to the label for storage in the memory. In that embodiment, the device is most preferably an MP3 player.

Preferably, the label further comprises a printable display or smart ink, which is actuated to provide an indication to a user that a product requires servicing.

According to a third aspect of the present invention there is provided a computerized product support system, arranged to both receive tones corresponding to product information from an acoustic coupling product label, and to transmit tones to the label to inform the label of the rate and time at which the system requires said information.

According to a fourth aspect of the present invention there is provided a method for providing product information over a standard telephone line to a computerized product support system, the method comprising the steps of: providing an acoustic coupling product label for mounting on a product to be serviced, the label having a memory containing the product information; locating a telephone near the label; activating the label so that tones corresponding to the product information are transmitted over the standard telephone; and controlling the transmission of said information at a rate and time required by the computerized product support system.

Preferably, the method further including the step of determining service entitlement, by the service provider, based on the information transmitted to the system by the label.

This invention provides an automated solution to both connecting a device to the service centre and transmitting all of the required information to complete the service call. It has the added advantage that the label can now store additional information that can be queried automatically by the automated call centre prior to connecting to a customer care agent. The information stored on the label can also be dynamically updated providing the most up to date information on the configuration of the self-service device and potentially device status information.

The advantages of this solution include increased automation of the connection, providing more accurate information to the call centre. The invention also enables more efficient use of the customer care agent, since comprehensive information can now be gathered automatically by an automated system allowing the agent to attend to more complex customer problems. The system also incorporates audio feedback on call progression for the user of the system providing a better interface.

Perhaps most importantly, the system provides a solution to the aforementioned problems that is intuitive for the user and allows the label to automatically pass the serial number plus other configuration information to the automated call centre system. It could also potentially be retrofitted to existing ATM's as well as incorporated into some of the smaller desktop ATM's.

BRIEF DESCRIPTION OF THE DRAWINGS

Embodiments of the present invention will now be described, by way of example, with reference to the accompanying drawings, in which.

DETAILED DESCRIPTION

Figure 1:
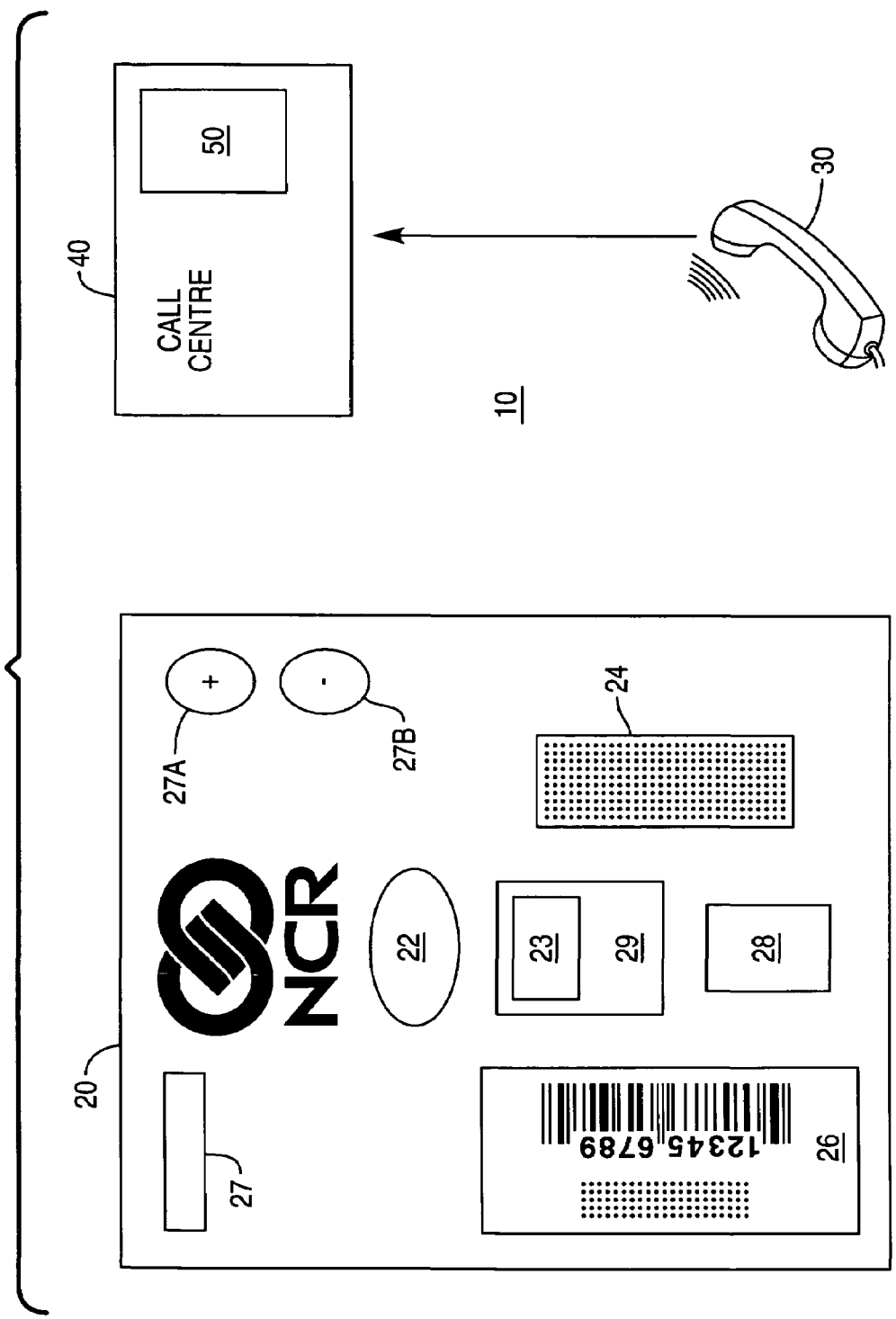
FIG. 1 is a diagram of an acoustic coupling product label system in accordance with the present invention.

Referring now to the drawings, in which like-referenced characters indicate corresponding elements throughout the several views, FIG. 1 illustrates the system 10 including an acoustic coupling product label 20, a standard telephone 30 at the customer site, and a call centre 40 housing a computerized support system 50. The acoustic coupling product label 20 is mounted on a product (not shown) in a relatively easily accessible location. The acoustic coupling product label 20 includes an activation switch 22, an acoustic transducer or speaker 24, and a label power source 28. The acoustic coupling product label also includes a product serial number or other product identification number 26. The product identification number 26 is in both human readable form (Arabic numbers) and in bar code form to be read by a scanner. In some embodiments one or other form of numbering may be utilized.

The acoustic coupling product label 20 can be formed of any standard components currently used to provide credit card or business card sized automatic dialers such as those described in U.S. Pat. No. 4,995,077 issued to Malnowski and U.S. Pat. No. 5,343,519 issued to Feldman. The acoustic coupling product label 20 also includes a memory 23 for storing at least the product identification number or other product identification information which is to be transmitted to the service provider.

The label power source 28 may be a battery power source or a solar power source from a solar collector (not shown) and is preferably a combination of the two types of power sources. The power source 28 for the acoustic coupling product label is independent from the product's power source so that it is always readily available. The power source may also includes a small rechargeable battery to supply the label with a short burst of energy greater than the collector alone can supply.

The activation switch 22 is preferably blended into the label such as a raised area under the company logo as shown in FIG. 1. The raised label preferably has a flexible area in the surface for engaging the activation switch 22 when slight pressure, as by a fingertip, is applied. Obviously, any type of switch may be used which fits compactly onto the label. Preferably the switch 22 is hidden behind a decal or insignia on the label.

The label 20, further includes two volume control buttons, one to increase volume (button 27A) and one to decrease volume (button 27B), which allow the user to change the volume depending on the environment (i.e. to increase volume in a noisy street environment), to enable better communications. This is fed, in this embodiment, by the call centre 40 reporting that the signal is too noisy and that the volume should be increased. However, it could alternatively be done automatically through the speaker microphone pairing on the label that automatically configures the volume level when it detected background noise.

Prior art acoustic labels only store the contact number of the service centre and serial number of the self-service device. This information is passed to the service centre and either relies on known timing of the delays within the call centre system or requires human intervention to trigger the passing of the information.

The label of FIG. 1 additionally includes intelligence and control means 29 resulting in a much more flexible automated solution, allowing variation in the timing of the information. This enables the label 20 to intelligently control when it sends the information to the automated system 50 in the service or call centre 40. The automated product support system 50 used in the call centre 40 for the initial connection are usually Interactive Voice Response Systems or Voice Response Units (IVR/VRU) which have the capability to automatically accept input from the tones generated from a standard handset.

These standard telephone control tones are Dual Tone Multi Frequency tones (DTMF) and can be used to pass information between the label 20 and the automated systems 50 in the call centre 40. The increased intelligence and control, from the control means 29, provides increased automation of the process and relieves the customer care agent of this simple data gathering.

Figure 2:
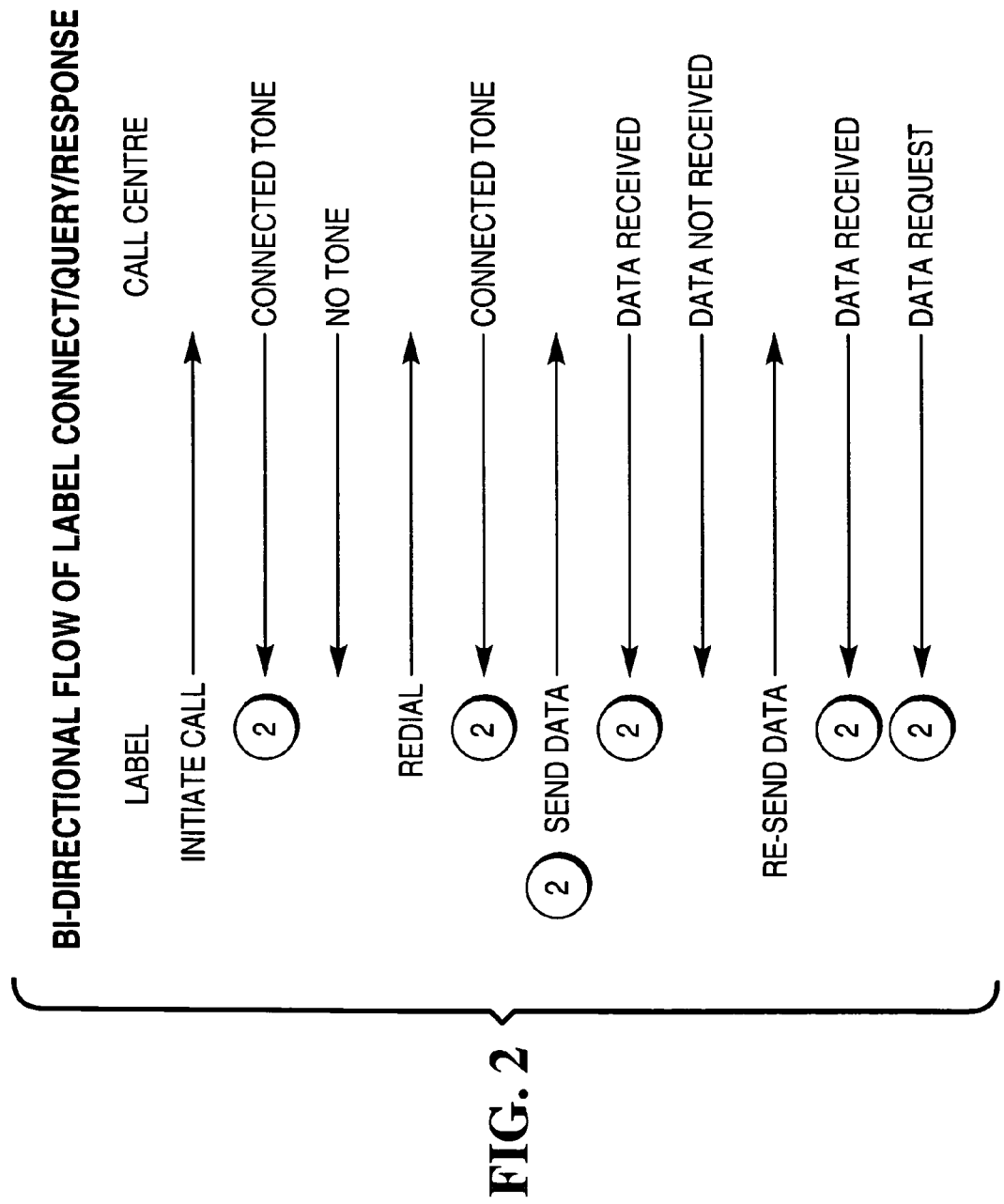
FIG. 2 is a schematic representation of the bi-directional flow of data in the system of FIG. 1, in more detail.

As illustrated in FIG. 2, by using these tones much of the data gathering can be done automatically by the call centre 40 interrogating the label for the required information in the required order. Correct timing of data transfer is vital to achieve the required bi-directional communication between the label 20 and the automated system 50, as the timing of the communication is dependent on the current state and availability of the call centre system 50.

When the call is initially placed it uses the Public Switched Telephony Network (PSTN) to place the call that the call centre answers. If the network is busy then the time to connect a call will vary, also if the call centre has no free inbound lines then the call may not be connected. In these conditions the label has to wait for a connection before it can send the serial number, or even redial the service centre number. To solve these problems when a call was connected the call centre system 50 sends a code either as a DTMF tone or in Frequency-Shift Keying (FSK) encoding to the label 20 to signal that a connection has been made. This allows the label 20 to start sending the serial number data, from the memory 23, after which it again waits for a response code from the call centre system 50 before sending any more data. By using two codes sent from the call centre 40 the label 20 can detect whether it should send the next data or re-send the previous data that was not understood at the call centre system 50. This can be expanded to support a number of other codes that can be used to query the different information that is held in the label 10. This means that the data is not restricted to be passed in a specific order allowing changes in the call centre call flow without having to change all the currently existing labels in the field.

Another issue with the current solution is that the staff member holds the phone 30 to the label 20 and is therefore unable to hear the responses from the call centre system 50. The integration of user feedback for the staff member making the call provides another advantage that reduced confusion during the call and makes the system simpler to use. The provision of audio feedback on the call progression avoids the need to remove the handset from the label to check that the call was connected. This would otherwise cause problems with the sending of data between the label and the service centre as only some of the data may be sent before the handset was removed disrupting the communication.

When a call is connected the service centre system response code is used to play a series of tones to the user to signal that the call has connected. These tones are outside the range of the tones that can be recognized by the phone so it is not detected by the handset and therefore the service centre system avoiding confusion. A similar communication strategy is used to provide feedback as other data is passed between the two systems. A different series of tones can be used when the user is required to remove the handset from the label and speak to the customer service agent. This allows the user to follow and understand the various stages of the service call through a simple interface.

The introduction of bi-directional passing of data between the label 10 and the automatic service centre system 50 provides additional information to the service or call centre 40. This information can include configuration information about the modules that the self-service device currently has installed.

This data can be dynamically updated as modules are added to and removed from the device by engineers. This is achieved by connecting the label through an audio cable (not shown) from the sound card in the self-service device. When the configuration application is run to update the module configuration the information could be sent as a new series of tones to the label to update the configuration.

This upgrading is achieved using software that converts the configuration information from the device (such as an ATM) into DTMF or FSK tones that could be sent through the sound card to the label 20. The label 20 would then interpret these and the codes stored in the memory 23 of the label 20 ready to be sent to the call centre 40, during the next service call.

Figure 3:
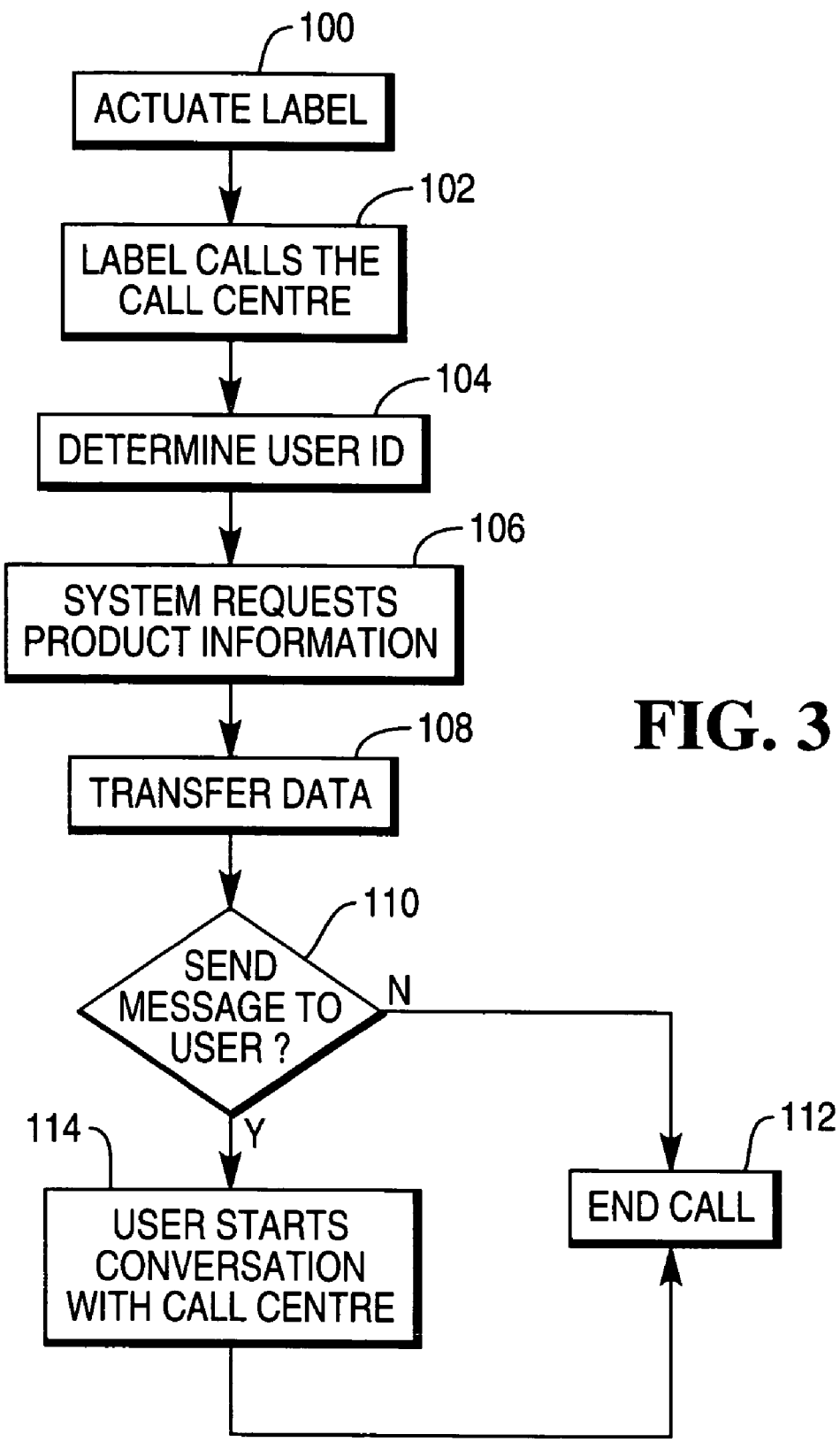
FIG. 3 is a flowchart of the method of operation of the label of FIG. 1, in accordance with the present invention.

Referring to FIG. 3, in operation, when a product to which an acoustic coupling label 20 is attached has a problem, the customer holds a telephone 30 to the label 20 and presses the button 22 to actuate the label (step 100). The label 20 then emits the service provider's phone number, in DTMF tones, to connect to the call centre system 50 (step 102).

The user's identity is then verified by the system 50, to stop accidental or malicious use of the label (step 104).

This can be done in a number of ways. For example, the user can be requested to provide a password. More preferably, in order to activate the label the user would have to press, say, three keys in a specific order to enable the communications. The three keys would be the start button (22) and the two volume buttons (27A 7 27B). This works as a PIN number that authenticated the user as a valid user of the label. There is not any limit to the size of the PIN number since the buttons could be pressed a number of times in different sequences. It could also be used to configure which service centre number that the label called depending on the PIN entered for different types of problems i.e. for level 1 support for replenishment or a different number if the machine actually needed to be repaired.

Alternatively, one can use the handset to capture the users voice and this could be compared to a stored sample in the label to authenticate the user. It could also be stored and passed to the service centre for authentication there, it could also be encoded in the label and then sent to service centre once the call was connected to allow authentication of the user and service level agreement. This would not have to be a full voice recognition solution it could simple be a word that the user spoke which was compared to a sample of that word from the user by simple pattern matching. In the simplest case the word could be used by all users as the trigger word with no actual verification of the user just the fact that they knew the code word to provide access to the label.

The call centre can also use the serial number to check the Service Level Agreement to stop abuse of the service centre by people without service contracts.

The system 50 then requests information at a rate and time as required (step 106). The control means 29 controls the label 20, through bi-directional transfer of data, to provide the data required by the system 50, as detailed in FIG. 3 (step 108).

This is achieved through the emission of a series of tones corresponding to the product's identification number and other product identification information, which the service provider's system 50 quickly recognizes and captures. The service provider uses the transmitted information to determine service entitlement or other service-related information.

Once the system 50 has received and verified all of the required information the system 50 sends a audible message, intended for the user (step 110). On receipt of the message the user either ends the call (step 112) or starts a conversation with one of the call centre staff (step 114) prior to ending the call.

The acoustic coupling product label 20 of the present invention uses a standard telephone connection and does not require the customer to purchase or provide any additional hardware such as a modem to enable the automatic capture of the serial number or other identification number or other product information.

Preferably, the acoustic coupling product label 20 is attractive enough to mount the label conspicuously on the front of the product. The acoustic coupling product label preferably does not replace the regulatory labeling as discussed above.

To provide the acoustic coupling product label functionality on existing products supported by the service provider, an acoustic coupling label can be provided as a field-installable label.

Figure 4:
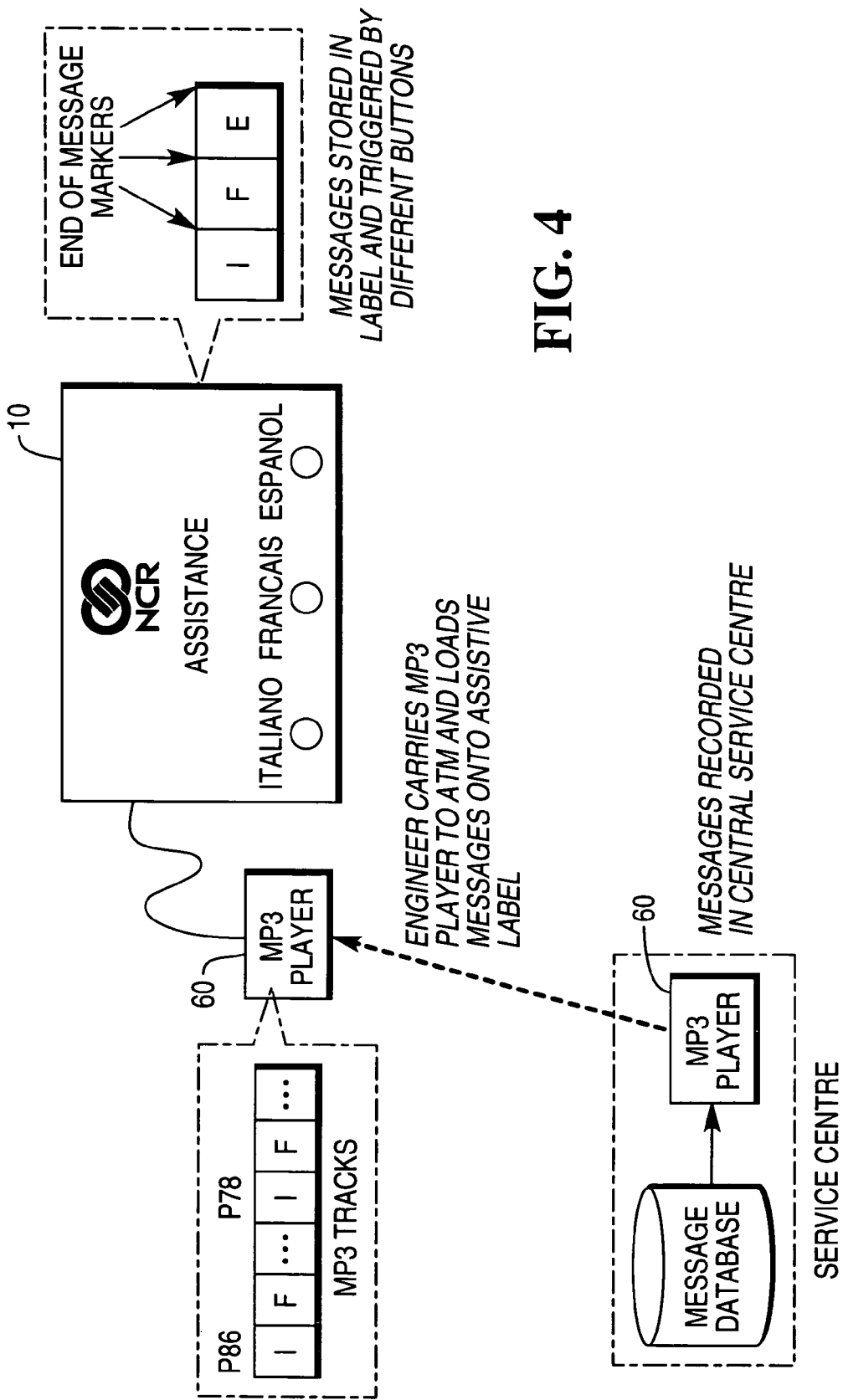
FIG. 4 is a second embodiment of an acoustic coupling product label system in accordance with the present invention.

As illustrated in FIG. 4, updating of the label 20 can also be arranged, for devices that do not contain a sound card. This is achieved using a device 60, such as an MP3 player, carried by the service engineer, which is used to capture the configuration information and convert it into tones that are then stored in the label 20. This allows the current dynamic information to be available to the call centre 40, giving improved levels of information on the device (not shown).

This also has the added advantage that the information is held outside the machine so it does not require it to be opened or taken out of service during the service call. This also has security advantages since the member of staff making the service call does not have access to any valuable media stored in the device. In some situations where the service level 10 may not provide on-site support, such as entry level off premise devices, it would be possible for the dynamic information to store part numbers for the replaceable parts. The call centre 40 can then query the label 20 and replacement parts can be automatically dispatched to the owner of the self-service device for them to fit.

Alternatively other methods of updating the dynamic information on the label could be used, such as enabling the label with RFID that could be used to receive the configuration information wirelessly from inside the self-service device. This would allow the information on the label to be automatically updated from the status monitoring system in the self-service device.

Also, the inclusion of smart-inks or small printable displays 27 on the label 20 provide a visual cue on the label that a service call is required. This allows the label to alert the local staff that they should use the smart label system to contact the call centre 40 increasing availability of the device and therefore increasing customer satisfaction. In addition, the label 20, once connected to the call centre 40, can upload the current configuration information as well as the latest system health information providing local information to the call centre 40 and therefore allowing more accurate diagnosis of problems and error states.

Also as illustrated in FIG. 4, the label 20 can also be used to provide multi-language support and audio lead through.

For example, the service engineer or replenisher can carry a small audio device 60 such as an MP3 player (as described above) which would contain the various messages required on a number of labels in all the required languages and dialects. The engineer could then download the audio clips they required onto the MP3 player ready to take into the field. At each self-service device the required audio clips could be selected on the MP3 player and downloaded onto the labels.

Although the invention has been described with particular reference to certain preferred embodiments thereof, variations and modifications may be effected within the scope of the present invention.

What is claimed is:

1. A system comprising:
    a) an acoustic coupling product label for mounting on a product to be serviced, the label including
        (i) a memory for storing information relating to the product to be serviced, and
        (ii) an acoustic transducer which emits tones corresponding to the product information;
    b) a computerized product support system which collects and interprets information provided by the label;
    c) a telephone; and
    d) control means for
        i) receiving information from the support system, which indicates (A) a time when data should be transmitted, and (B) data rate for transmitted data, and
        ii) transmitting data from the label over the telephone to the system at said rate and said time.

2. A system as claimed in claim 1, further comprising a power source which is independent of a power source of the product to be serviced.

3. A system as claimed in claim 1, wherein additional tones corresponding to a telephone number of a service provider are transmitted before the tones corresponding to the product information.

4. A system as claimed in claim 1, wherein the computerized product support system notifies appropriate service personnel for the product to be serviced.

5. A system as claimed in claim 1, wherein the user's identity is verified, so as to stop accidental or malicious use of the label.

6. A system as claimed in claim 5, wherein a password is received from the user to verify identity of the user.

7. A system as claimed in claim 5, wherein a PIN number is received from the user to verify identity of the user.

8. A system as claimed in claim 7, wherein a number of buttons on the label is arranged to enable entry of the PIN number.

9. A system as claimed in claim 5, wherein the user's voice is compared to a stored sample in order to authenticate the user.

10. A system according to claim 1, wherein the label stores multiple different types of information about the product, and different respective incoming codes cause the label to transmit the respective information.

11. An acoustic coupling product label for mounting on or near the front of a product or in an easily accessible location on a product to be serviced, the label comprising:
    a) a memory for storing information relating to the product to be serviced;
    b) an activation switch;
    c) an acoustic transducer which emits tones corresponding to the product information; and
    d) control means for
        i) receiving information which indicates
            (A) times when data should be transmitted, and
            (B) data rate required for transmitted data, and
        ii) transmitting data from the label at said rate and said time.

12. A label as claimed in claim 11, further comprising a power source which is independent of a power source of the product to be serviced.

13. A label as claimed in claim 11, further comprising at least two buttons, the actuation of each providing broadcast information in a different language.

14. A label as claimed in claim 11, further comprising means for enabling dynamic updating of the information in the memory.

15. A label as claimed in claim 14, wherein the information in the memory is updated from the product to be serviced, via a sound card.

16. A label as claimed in claim 14, wherein the information in the memory is updated via the use of a device which is used to capture configuration information and convert it into tones for transmission to the label for storage in the memory.

17. A label as claimed in claim 16, wherein the device comprises an MP3 player.

18. A label as claimed in claim 11, further comprising a printable display or smart ink, which is actuated to provide an indication to a user that a product requires servicing.

19. A label as claimed in claim 11, further comprising volume control means.

20. An acoustic coupling product label according to claim 11, wherein the label stores multiple different types of information about the product, and different respective incoming codes cause the label to transmit the respective information.

21. A computerized product support system comprising:
means for receiving tones corresponding to product information from an acoustic coupling product label; and
means for transmitting tones to the label to inform the label of the data rate and time at which the system requires the information.

22. A system as claimed in claim 21, further comprising means for notifying appropriate service personnel for the product to be serviced.

23. A method of providing product information over a standard telephone line to a computerized product support system, the method comprising the steps of:
a) providing an acoustic coupling product label for mounting on a product to be serviced, the label having a memory containing the product information;
b) locating a telephone near the label;
c) activating the label so that tones corresponding to the product information are transmitted over the standard telephone;
d) receiving information from the support system which indicates one or more times when data should be transmitted by the label, and data rates which should be used and
e) transmitting the information at said rate and time required.

24. A method as claimed in claim 23, wherein the label is mounted on the front of a product to be serviced.

25. A method as claimed in claim 23, wherein additional tones corresponding to a telephone number of a service provider are transmitted before the tones corresponding to the product information.

26. A method as claimed in claim 23, wherein additional tones indicating that the call is an authorized service call are transmitted before the tones corresponding to the product information.

27. A method as claimed in claims 23, further comprising the step of determining service entitlement, by a service provider, based on the information transmitted to the system by the label.

28. A method as claimed in claim 23, wherein a call centre uses a serial number of the label to check a Service Level Agreement to stop abuse of the call centre by people without service contracts.

29. A method as claimed in claim 23, further comprising the step of verifying the user's identity, so as to stop accidental or malicious use of the label.

30. A method as claimed in claim 29, wherein the user enters a password, so as to be authenticated as a valid user of the system.

31. A method as claimed in claim 29, wherein the user enters a PIN number, so as to be authenticated as a valid user of the system.

32. A method as claimed in claim 31, wherein the user enters the PIN utilizing a number of buttons on the label.

33. A method as claimed in claim 29, wherein the user's voice is compared to a stored sample in order to authenticate the user.

* * * * *